US009273612B2

(12) United States Patent
Kagolanu et al.

(10) Patent No.: US 9,273,612 B2
(45) Date of Patent: Mar. 1, 2016

(54) METHOD OF OPERATING A GAS TURBINE FOR REDUCED AMMONIA SLIP

(71) Applicants: Ramesh Kagolanu, Winter Springs, FL (US); Jordan M. Haywood, Oviedo, FL (US)

(72) Inventors: Ramesh Kagolanu, Winter Springs, FL (US); Jordan M. Haywood, Oviedo, FL (US)

(73) Assignee: Siemens Aktiengesellschaft, München (DE)

( * ) Notice: Subject to any disclaimer, the term of this patent is extended or adjusted under 35 U.S.C. 154(b) by 537 days.

(21) Appl. No.: 13/747,514

(22) Filed: Jan. 23, 2013

(65) Prior Publication Data

US 2014/0202166 A1 Jul. 24, 2014

(51) Int. Cl.
F02C 9/00 (2006.01)

(52) U.S. Cl.
CPC ........... F02C 9/00 (2013.01); F01N 2900/1616 (2013.01); F01N 2900/1812 (2013.01); F05D 2270/082 (2013.01); F05D 2270/306 (2013.01)

(58) Field of Classification Search
CPC ............... F02C 9/00; F01N 2900/1812; F01N 2900/1616; F01N 2570/14; F01N 2610/02; F05D 2270/082; F05D 2270/306
USPC ....................... 60/773, 39.5, 39.182, 301–303
See application file for complete search history.

(56) References Cited

U.S. PATENT DOCUMENTS

| 4,131,432 | A | * | 12/1978 | Sato et al. ..................... 422/177 |
| 4,473,536 | A | * | 9/1984 | Carberg et al. ............ 423/239.1 |
| 5,813,212 | A | * | 9/1998 | Oguchi et al. ................. 60/39.5 |
| 6,446,430 | B1 | | 9/2002 | Roth |
| 6,620,393 | B2 | | 9/2003 | Spokoyny |
| 7,150,145 | B2 | | 12/2006 | Patchett |
| 7,166,262 | B2 | | 1/2007 | Buzanowski |
| 7,191,588 | B2 | * | 3/2007 | Tanaka et al. ................ 60/39.27 |
| 8,109,079 | B2 | | 2/2012 | Wills |
| 8,112,986 | B2 | | 2/2012 | Kurtz |
| 8,181,451 | B2 | | 5/2012 | VanderVeen |
| 2004/0057889 | A1 | | 3/2004 | Buzanowski |
| 2008/0089821 | A1 | | 4/2008 | Minkara |
| 2009/0185954 | A1 | * | 7/2009 | Qi et al. ........................... 422/62 |
| 2010/0212413 | A1 | | 8/2010 | Krüger et al. |
| 2011/0005202 | A1 | | 1/2011 | Gady |
| 2011/0030331 | A1 | * | 2/2011 | Tong et al. ..................... 60/39.5 |
| 2011/0154806 | A1 | * | 6/2011 | Hoyte et al. .................... 60/276 |
| 2012/0096835 | A1 | | 4/2012 | Gates et al. |

OTHER PUBLICATIONS

Peltier, Robert, "Flexible Turbine Operation is Vital for a Robust Grid", Sep. 1, 2010, Power Magazine, http://www.powermag.com/flexible-turbine-operation-is-vital-for-a-robust-grid/.*
Control Technology Center, "Control and Pollution Prevention Options for Ammonia Emissions", EPA-456/R-95-002, Apr. 1995.
Siemens, "Optimizing SCR/SNCR Processes—Ammonia Slip—Power Plants".
Schmitt, Joshua C., "Thesis—Selective Catalytic Reduction" Testing, Numeric Modeling, and Control Strategies, Spring 2010.
Leopold, Tim, "Tuning Ammonia Flow to Optimize SCR Performance", ABB Inc., Jan. 1, 2010.

* cited by examiner

Primary Examiner — Steven Sutherland

(57) ABSTRACT

Described herein are methods of operating a gas turbine engine (12) for reduced ammonia slip. An exemplary method (100) includes operating (102) the engine over a range of power output levels; controlling (104) a mass flow of NOx produced in exhaust (19) of the engine to be within 10% over the range of power output levels; and treating (106) the exhaust of the engine in a selective catalytic reduction process (22). In this way, the production of NOx and a corresponding flow of reducing agent (33) utilized in the SCR process remain relatively constant in terms of mass (molar) flow throughout the range of power output levels and ammonia slip is controlled.

12 Claims, 3 Drawing Sheets

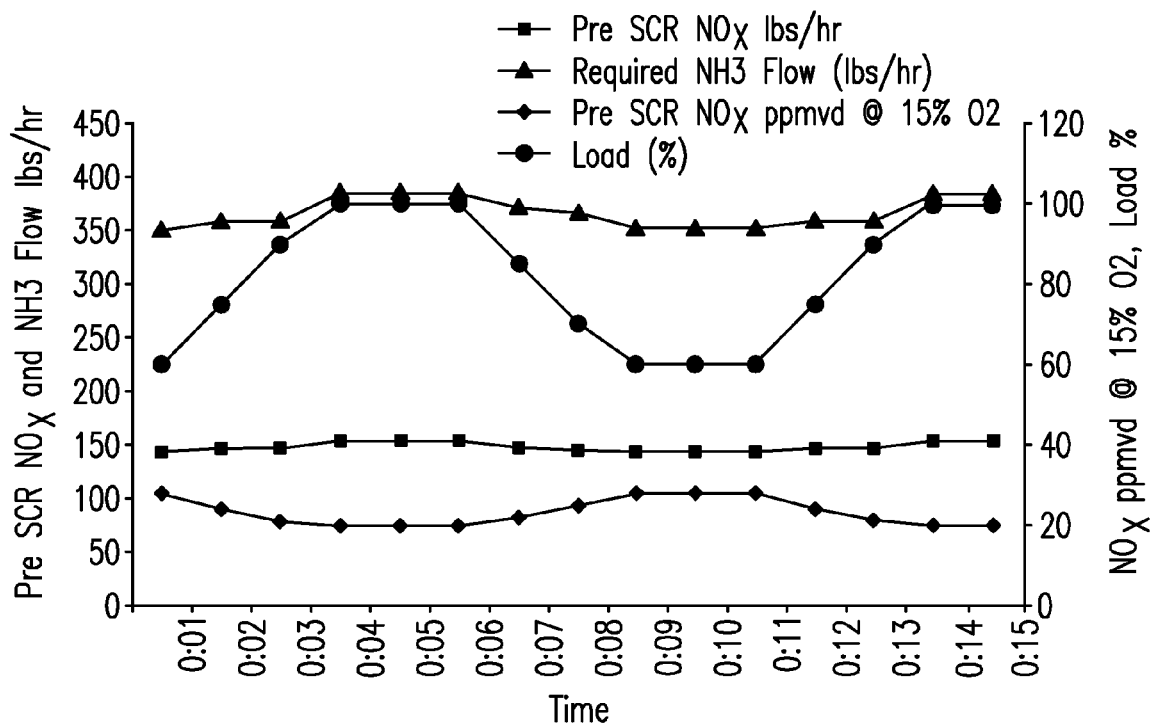
FIG. 5
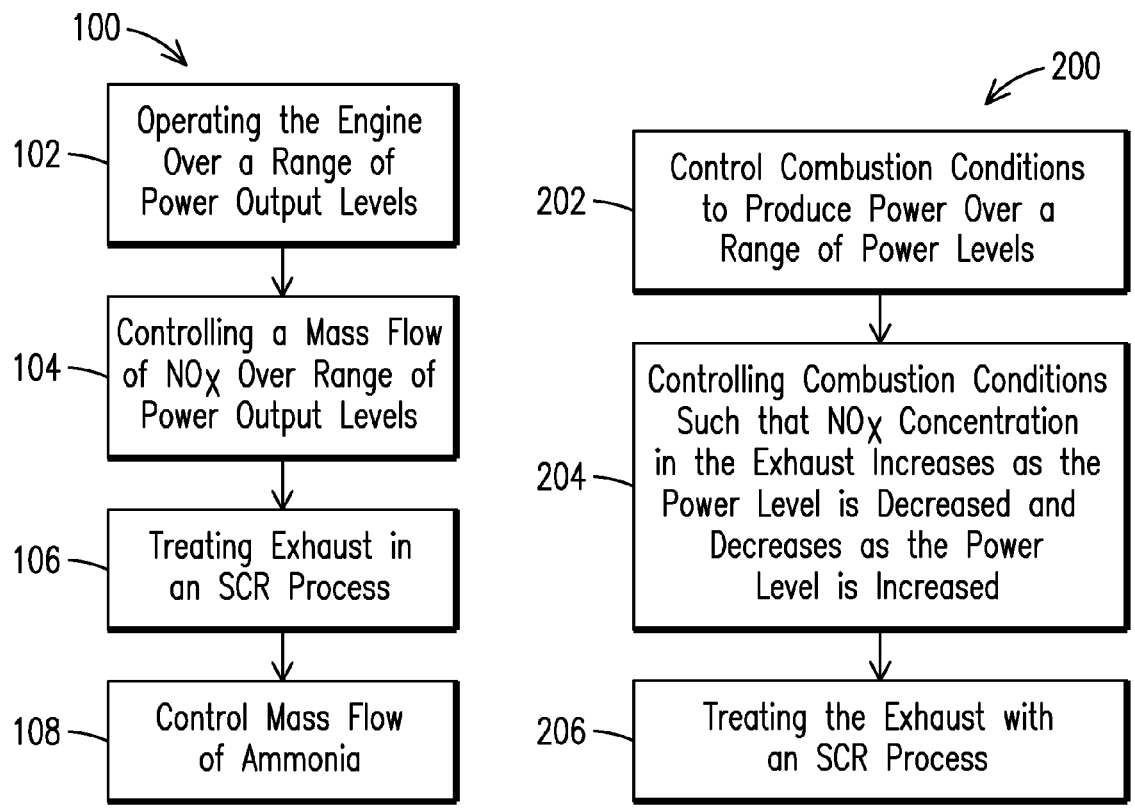
FIG. 6
FIG. 7

METHOD OF OPERATING A GAS TURBINE FOR REDUCED AMMONIA SLIP

FIELD OF THE INVENTION

The present invention relates generally to gas turbine engines and, more particularly, to a method for controlling ammonia slip from a selective catalytic reduction treatment of exhaust gas by stabilizing NOx production when ramping the turbine engine between power output levels.

BACKGROUND OF THE INVENTION

In order to reduce emissions of air pollutants, and especially nitrogen oxides (NOx), the United States Environmental Protection Agency (EPA) has issued strict emissions standards for the power generation industry, including gas, oil, and coal-fired power plants. NOx is generated from the combustion of any fuel in the presence of air. In typical gas turbine systems, the majority of NOx is generated by the pilot flame, which burns at a high temperature and stabilizes the combustion of a leaner supply of premixed fuel and air. Because NOx is an undesirable gas in the environment and its emission must be limited, the conventional wisdom is to produce as little NOx as possible in the combustion process, such as by delivering as little fuel to the pilot flame as is necessary to achieve flame stability at various power levels.

Nevertheless, some NOx is always produced and the amount of NOx produced increases as the power level of the turbine increases. Post-combustion treatment methods such as selective catalytic reduction (SCR) are known to reduce the amount of NOx in the exhaust gas stream to low levels prior to release to the environment. Various reducing agents can be used in SCR systems, including hydrogen, ammonia, urea, etc. Ammonia is one of the most efficient reducing agents for reducing NOx emissions to low levels. However, ammonia is also harmful to the environment, and ammonia slip can occur when ammonia passes through the SCR system into the environment without reacting with NOx. U.S. Pat. No. 7,166,262 describes a method for minimizing ammonia slip by closely regulating the flow of ammonia in response to detected ammonia and nitrogen oxide levels. However, even with the tight regulation of ammonia levels, the amount of ammonia can fluctuate substantially during load changes of the corresponding engine.

BRIEF DESCRIPTION OF THE DRAWINGS

The invention is explained in the following description in view of the drawings that show:

FIG. 5 is a graph showing operational data for NOx and $NH_3$ flows with the NOx mass flow in the engine exhaust gas held relatively constant as power levels change.

FIG. 6 shows a method for operating a gas turbine.

FIG. 7 shows another method for operating a gas turbine.

DETAILED DESCRIPTION OF THE INVENTION

Figure 1:
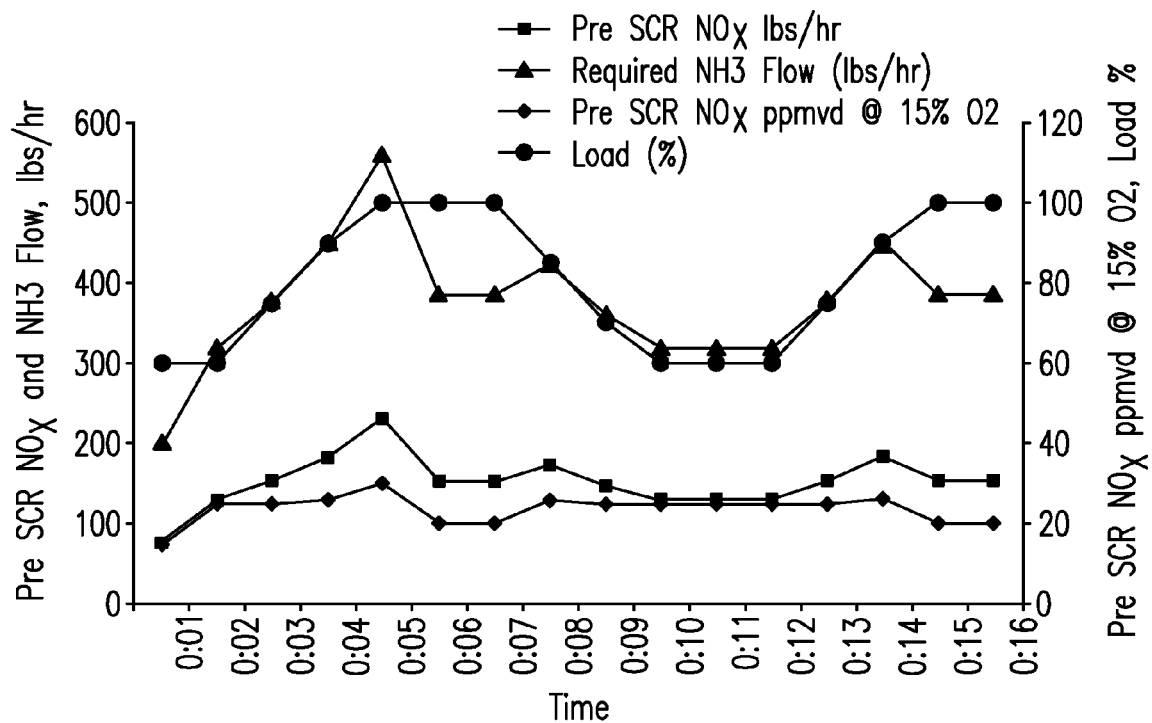
FIG. 1 is a graph showing operational data for pre-SCR NOx and $NH_3$ flow rates during engine ramping as known in the art.

Typically, a combustion turbine engine is tuned to minimize NOx production at all power levels, and ammonia is added on a stoichiometric basis relative to the amount of NOx in the exhaust gas introduced into the SCR system. As shown in FIG. 1, changes in power level (shown as Load %) will result in changes in NOx production, which in turn, will require proportional changes in ammonia flow.

The present inventors have recognized that ammonia slip is most problematic during rapid power level changes when the demand for ammonia for reaction with NOx is changing rapidly. Counter to conventional wisdom, the present inventors disclose methods herein where the generation of a minimum amount of NOx during combustion is not the primary goal, but rather, the aim is the production of a relatively constant mass of NOx even if this constant amount is a higher amount of NOx than the possible minimum. Aspects of the present invention are particularly advantageous during load follow operation of the engine over a plurality of power output levels. When the NOx produced by the engine remains relatively constant in terms of mass (molar) flow rate throughout gas turbine load changes (ramping), the result is a more stable or nearly constant demand for the reducing agent, e.g., ammonia, in the SCR system. The higher than minimum NOx production remains within the capability of the SCR system, and the relatively constant mass flow of NOx allows for improved control of ammonia slip so that air permit compliance levels are met even during load follow operation.

Figure 2:
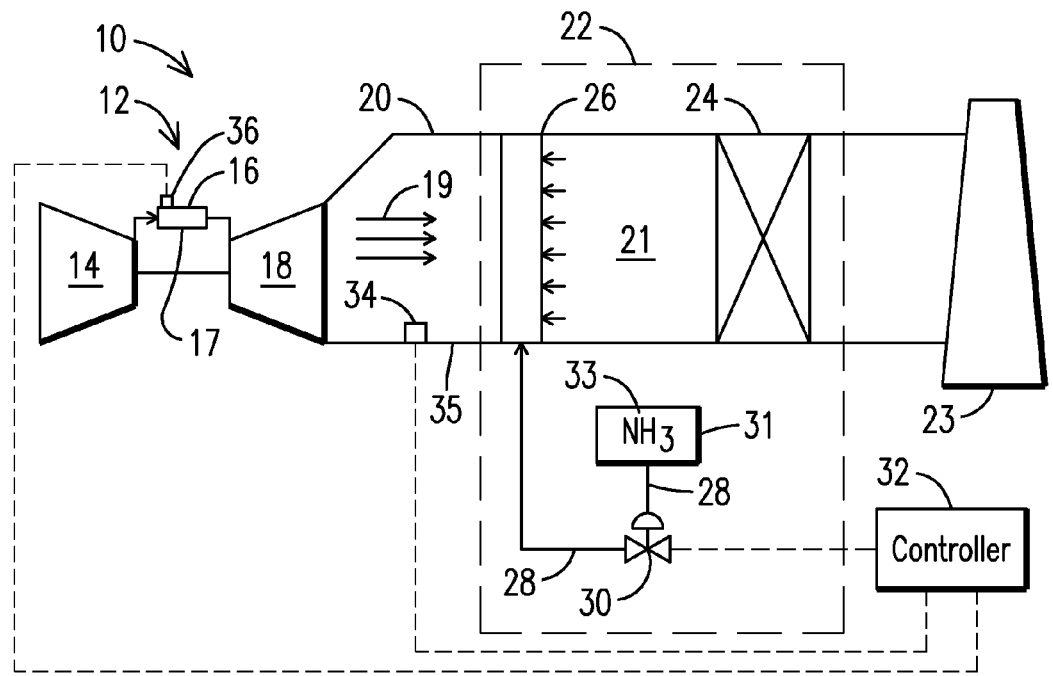
FIG. 2 is a schematic view of a gas turbine power generation plant with a selective catalytic reduction system as may be used to implement the invention.

FIG. 2 shows a power generation plant 10 having a gas turbine engine 12 within which the methods described herein may be utilized. It is understood, however, that the present invention is not so limited to use in the embodiment shown. The turbine engine 12 generally includes a compressor section 14, a combustor section 16 having a combustor 17, a turbine section 18 and an exhaust section 20 as shown. In operation, the compressor section 14 compresses ambient air. From the compressor section 14, the compressed air may enter one or more combustors in the combustor section 16. The compressed air is mixed with fuel, and the air-fuel mixture is burned in the one or more combustors to form a hot working gas. From the combustor section 16, the combusted, hot gas is delivered to the turbine section 18 where the hot gas is expanded through alternating rows of stationary and rotating vanes to drive a rotor, which is attached to an electrical generator (not shown). The expanded gas exiting the turbine section 18 can be exhausted from the engine via the exhaust section 20. Exhaust gases 19 from the turbine 12 can pass through a heat recovery steam generator if desired, after which the exhaust gas 19 exits an exhaust stack 23 to the atmosphere.

An SCR system 22 can be placed in the flow path 21 of the exhaust 19. The SCR system 22 includes a catalyst 24 as is known in the art for NOx reduction, which is placed in the exhaust flow path 21. The SCR system 22 includes one or more injectors, typically forming an injection grid 26, for introducing a reducing agent into the exhaust gas 19, placed upstream of the catalyst 24 relative to the direction of exhaust gas flow path 21. A reducing agent source 31 supplies a reducing agent 33 to the injection grid 26, such as by a fluid supply conduit 28. In certain embodiments, a flow control valve 30 is placed in the supply conduit 28 to selectively control the flow of the reducing agent 33.

A system controller 32 is typically connected to the flow control valve 30 to regulate the flow of the reducing agent to the injection grid 26. The controller 32 can be comprised of hardware, software or any combination thereof as is known in the art. In addition to controlling components within the power generation plant 10, the system controller 32 can include data collection and analysis capabilities. For instance, the system controller 32 can be operatively connected to one or more sensors within the power generation plant 10 to provide desired data as described. The term "operatively connected," as used herein, can include direct or indirect connections, including connections without direct physical contact.

In certain embodiments, the controller 32 is configured to regulate the flow of the reducing agent 33 based upon the mass flow of NOx entering the SCR system 22 The NOx mass flow rate may be a predicted value or a measured value. The actual amount of NOx in the exhaust 19 can be measured by one or more sensors 34 operatively connected to the controller 32 and positioned with respect to the exhaust section 20 to provide data to the controller 32 on the amount of NOx at or near the inlet 35 of the SCR unit, for example. The measured amount of NOx at the inlet of the SCR system 24 will typically be measured in ppmvd (parts per million, volumetric dry) and then converted into a NOx mass flow rate in lbs/hour as set forth in U.S. Published Patent Application No. 20120096835, the entirety of which is incorporated by reference herein.

Still further, the controller 32 may be operatively connected to one or more sensors 36 operatively positioned with respect to the combustor section 16 to provide data on a mass flow rate of a pilot fuel flow, a premix fuel flow, and/or a main nozzle fuel flow. Moreover, the controller 32 can be operatively connected to the combustor section 16 to control the amount of fuel and/or air directed to the one or more injectors or mixers for providing the above-described fuel flows. In still another aspect, the controller 32 may be operatively connected to the exhaust section 20 to selectively increase and/or decrease the flow of the exhaust 19 input into the SCR system 22.

Figure 3:
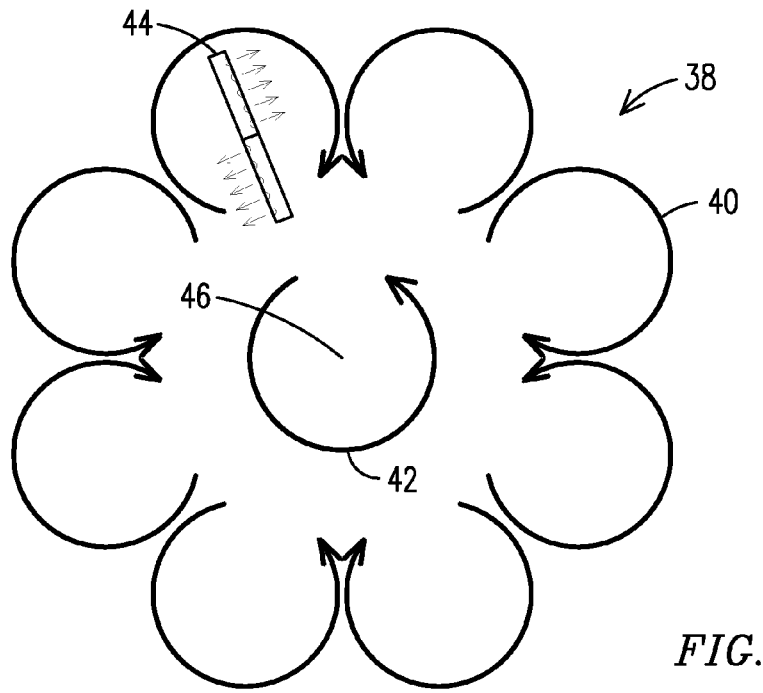
FIG. 3 is a cross-sectional view of a typical combustor for use in the system of FIG. 2.

Now referring to FIG. 3, there is shown a cross-sectional view of an exemplary can 38 of the combustor 17 for the combustion section 16. Typically, the combustor 17 comprises several individual cans 38. Within each can 38, there are multiple swirlers that impart rotational movement to an air/fuel mixture traveling there through. As shown in FIG. 3, there are shown eight main fuel swirlers 40 surrounding a central pilot swirler 42, although the present invention is not so limited. Each of the swirlers 40, 42 is fed an amount of fuel and/or fuel air by one or more injectors 44 that introduce fuel and/or an air/fuel mixture to a compressed air flow. Once ignited, the pilot swirler 42 produces a pilot flame 46 and ignition of the fuel/air mixture traveling through the main fuel swirlers 40 completes the formation of a combustion zone within the can 38.

During normal operation of the turbine, the turbine is generally "fired up" by increasing fuel and/or fuel/air flow to the pilot swirler 42 and the main fuel swirlers 40 until the turbine 12 is operating at full load. Typically, the amount of NOx produced by the combustion section 16 increases as the turbine 12 is ramped up to full load and the combustion temperature increases. The percentage of the total fuel flow delivered to produce the pilot flame 46 is a significant factor in the level of NOx produced.

Typically, the amount of fuel delivered to produce the pilot flame 46 is increased as the engine 12 is ramped toward full load. Counter to intuition however, aspects of the present invention direct a relatively constant amount of fuel to the pilot injector(s) 44 to produce a relatively constant mass flow of NOx in the exhaust 19. In one embodiment, the amount of fuel directed to the pilot flame 46 is the amount (within 10% or less) of fuel that would be delivered to it at or near full load. The theoretical amount of fuel delivered to the pilot at or near (within 10% or less) full load may be that amount needed to achieve flame stability with a minimal amount of NOx at full power.

In a typical application, more fuel is added to pilot flame 46 (e.g. during ramping fuel flow to the pilot may change from 5% to 8-9% at full load) in order to maintain flame stability. This same increase in fuel flow to the pilot flame 46, however, causes NOx to increase. In certain aspects of the present invention, the fuel flow to the pilot flame 46 is intentionally maintained at a higher level (e.g. ~7%-8% of total fuel at 50% load) such that during ramping, fuel flow to the pilot flame 46 need not be increased as the engine is ramped from part-load (e.g., 50%) to 100% load. While this may result in higher than minimum engine NOx emissions throughout the load range of the turbine's operation, the NOx mass flow levels are kept relatively constant. In this way, the engine 12 actually increases the fuel flow to the pilot flame 46 such that while NOx output may be higher, NOx output is more stable (meanwhile the exhaust stack NOx is still controlled to within air permit levels with the SCR system, albeit with potentially lower ammonia slip).

The variability of NOx mass production across a range of power levels may differ according to various embodiments. In one embodiment, the term "constant" or "relatively constant" as used herein refers to a value that is at or within a 10% range. In other embodiments, the term "constant" or "relatively constant" means within a 5% range. In still another embodiment, the term "constant" or "relatively constant" means within a 3% range.

As illustrated in FIG. 1, NOx engine emissions produced during typical operation will change as power level changes. One method to stabilize NOx mass emissions would be to maintain the concentration of NOx (ppm) constant as power levels change. However, it is contemplated that when load for the engine 12 is increasing, though the molar volume of NOx may be constant, the mass and density of air moving through the engine 12 is increasing as the load is increasing. Thus, even with a constant rotational speed turbine, the mass flow rate through the turbine will increase as power increases. Accordingly, even when the ppm concentrations are kept constant for any component such as NOx, the mass of the components are increasing because the engine exhaust flow rate is increasing. As an example, when a combustor is tuned to maintain a constant amount of NOx on a ppm level across a range of power levels, for example 9 ppm, the mass flow rate of NOx will change with power level on a lbs/hr basis. For example, the lbs/hr of NOx between 60% and base "full" load may change from 60 to 100 lbs/hr in one such aspect of the invention, which is an improvement over the current methodology, but not does optimize the benefit of the invention.

Aspects of the present invention aim to maintain the mass (molar) flow of NOx constant across power levels such that the engine 12 produces a greater amount of NOx on a ppmvd basis at part loads than at full load. Although the NOx concentration (ppm) is greater at part load than at full load, the NOx mass flow rate (lbs/hr or moles/hr) is (approximately) the same at all loads. Therefore the concentration (ppm) of NOx may be used as a control variable to maintain the same or substantially similar mass load of NOx across a plurality of power output levels.

Since the reducing agent injection rate is based on the engine NOx mass flow rate (lbs/hr or moles/hr), if NOx mass flow rate is held relatively constant, the reducing agent injection rate may be held relatively constant. In this way, aspects of the present invention use a counterintuitive approach because one would typically maintain NOx ppm at a minimum. However, to control fluctuations in both exhaust stack NOx and in potential ammonia slip (when ammonia is used as the reducing agent), the NOx lbs/hr is kept relatively constant in the present invention instead of maintaining NOx ppm constant.

Referring again to FIG. 2, the amount of reducing agent 33 delivered to the injection grid 26 is directly related to the mass flow of the NOx, and not the concentration of NOx (ppm). In this way, it is desired to tune the engine 12 to output a relatively constant mass flow of NOx as described. This, in turn, will allow for a relatively predictable flow of the reducing agent 33 to be delivered. When the reducing agent 33 is ammonia, a relatively constant amount of ammonia can then be delivered to the SCR unit 24. The amount of ammonia may be a stoichiometric amount relative to the amount of NOx to be reduced. In certain embodiments, the ammonia may be provided in a predetermined stoichiometric excess. This relatively constant amount may reduce ammonia slip, which is typically caused by surges in ammonia delivery during load changes of the engine 12, which are absent in the present invention. The relatively constant amount of ammonia may be within 10%, preferably within a 5% range, and more preferably within a 3% range about a desired ammonia mass flow value.

Figure 4:
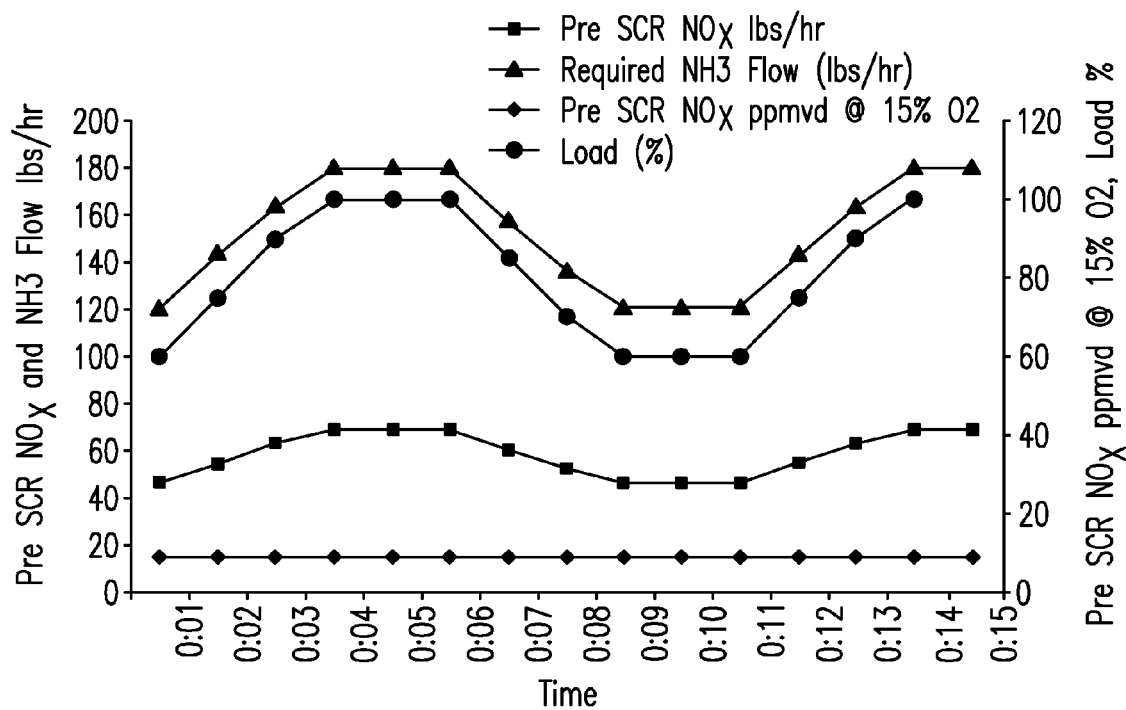
FIG. 4 is a graph showing operational data for NOx and $NH_3$ flows with the NOx concentration in the engine exhaust gas held constant as power levels change.

Referring to FIGS. 4-5, the graphs therein demonstrate the improved results attained by maintaining a relatively constant mass flow of NOx into the inlet 35 of the SCR system 22 during power level changes instead of maintaining the lowest possible NOx level at each power level as was illustrated in FIG. 1. As shown in FIG. 4, if the NOx is kept at a constant ppm level of 9, the change in the amount of ammonia required is more gradual than shown in FIG. 1, and therefore the ammonia slip may be reduced when compared to the prior art. While this embodiment is effective, constant ammonia levels are not maintained.

In contrast, as shown in FIG. 5, the NOx and ammonia lines (lbs/hr) are much more constant over the plurality of power output changes when NOx is held relatively constant on a lbs/hr basis (see Pre SCR NOx lbs/hr). In this way, a relatively constant flow of NOx and thus ammonia can be provided, and ammonia slip is minimized during load changes.

Based upon the above disclosure, there are provided methods and systems for achieving a more constant and predictable level of NOx, which allow for the corresponding constant and stable injection of reducing agent 33 to reduce NOx in the SCR system 22. In accordance with one aspect of the invention, as shown in FIG. 6, there is provided a method 100 of operating a gas turbine engine 12. The method comprises step 102 of operating the engine 12 over a range of power output levels (for example, from 50 or 60% to 100% of full load). The method 100 further comprises step 104 of controlling a mass flow of NOx produced in exhaust 19 of the engine 12 to be maintained within 10% of a constant NOx mass flow value over the range of power output levels. In certain embodiments, the mass flow is controlled to be maintained constant within 5% over a range of power output levels. In more particular embodiments, the mass flow value is controlled to be maintained constant within 3% over a range of power output levels. As explained above, in one embodiment, the constant mass flow value may be a minimum mass flow of NOx that must be produced at full (100%) load in order to maintain the combustion within desired stability limits under selected operating conditions. Lastly, the method includes step 106 of treating the exhaust 19 of the engine 12 in a selective catalytic reduction process, such as with SCR system 22, typically using a reducing agent 33 such as ammonia.

In certain embodiments, the method 100 further comprises step 108 of controlling a mass flow of the ammonia to be maintained within 10%, preferably 5%, and more preferably within 3%, of a constant ammonia mass flow value over the range of power output levels. The constant ammonia mass flow value corresponds to the constant NOx mass flow value, thereby providing a relatively constant amount of ammonia and reducing ammonia slip in the SCR process.

In accordance with another aspect of the present invention illustrated in FIG. 7, there is provided a method 200 of operating a gas turbine engine 12. The method 200 comprises step 202 of controlling combustion conditions in the engine 12 to produce power over a range of power levels in response to a demand. In addition, the method 200 comprises step 204 of controlling the combustion conditions such that a concentration of NOx in exhaust 19 produced by the engine 12 increases as the power level is decreased and decreases as the power level is increased. Typically, the concentration is measured in ppm's of NOx. In the method 200, the change in concentration of NOx as the power level is changed is responsive to a change in a total mass flow of the exhaust 19 such that a total mass flow of NOx in the exhaust 19 is held relatively constant, such as within 10%, within 5%, or within 3% of a constant NOx mass flow value over the range of power levels. In one embodiment, the constant mass flow value may be selected to be a mass flow of NOx produced by the same turbine operating at full (100%) load under a prior art operating scheme which minimizes the mass of NOx produced. Lastly, the method 200 comprises step 206 of treating the exhaust with a selective catalytic reduction process to control an amount of NOx released to an ambient environment as described herein.

In certain embodiments, the step 206 of treating comprises reducing an amount of NOx in the exhaust 19 using an amount of ammonia as the reducing agent 33, and wherein a mass flow of ammonia utilized in the SCR process corresponds to the mass flow of NOx during operation such that ammonia mass flow values also do not vary more than ±10% from a constant ammonia mass flow value over the range of power output levels, thereby reducing ammonia slip in the SCR process. In one embodiment, the constant ammonia mass flow value is at least a stoichiometric amount of ammonia needed to reduce a corresponding mass flow of NOx into the SCR unit.

The controlling steps may be accomplished by maintaining a fuel flow to one or more of the pilot injector(s) 44 over the range of power output levels at or within 10%, preferably 5%, and more preferably within 3%, of a fuel flow to the pilot injector(s) at or near full (e.g., 90 to 100%) load. It is contemplated, however, that any other method may be utilized that results in a relatively constant NOx mass flow as described herein.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method of operating a gas turbine engine, the method comprising:
   operating the gas turbine engine over a range of power output levels;
   controlling a mass flow of NOx produced in exhaust of the gas turbine engine to be within 10% of a selected NOx mass flow over the range of power output levels; and
   treating the exhaust of the gas turbine engine in a selective catalytic reduction process,
   wherein the method further comprises:
   operating the gas turbine engine over the range of power output levels in a load follow operation mode;
   controlling the mass flow of NOx produced to be higher than a minimum mass flow of NOx that could be produced over the range of power output levels, such that the mass flow of NOx is stable over the range of power output levels compared to the minimum mass flow of NOx over the range of power output levels; and treating the exhaust of the gas turbine engine in the selective catalytic reduction process with a stable amount of reducing agent proportionate to the stable mass flow of NOx produced over the range of power output levels.

2. The method of claim 1, wherein the mass flow of NOx produced in the exhaust is controlled to be constant within 5% of the selected NOx mass flow over the range of power output levels.

3. The method of claim 1, wherein the mass flow of NOx produced in the exhaust is controlled to be constant within 3% of the selected NOx mass flow over the range of power output levels.

4. The method of claim 1, wherein the treating comprises reducing an amount of NOx in the SCR process using ammonia.

5. The method of claim 4, further comprising controlling a mass flow of the ammonia to be constant within 10% over the range of power output levels, an ammonia mass flow value corresponding to a value of the mass flow of NOx produced in the exhaust, thereby controlling ammonia slip in the SCR process.

6. The method of claim 4, further comprising controlling an ammonia mass flow in the selective catalytic reduction process over the range of power output levels.

7. The method of claim 6, wherein the ammonia mass flow is controlled to be constant within 3% over the range of power output levels.

8. The method of claim 1, wherein the controlling is done by maintaining a fuel flow to a pilot flame of the gas turbine engine over the range of power output levels within 10% of a fuel flow to the pilot flame at full load.

9. The method of claim 8, further comprising controlling a fuel flow to a pilot flame of the gas turbine engine over the range of power output levels to be within 3% of a fuel flow to the pilot flame at full load.

10. The method of claim 1, wherein the selected NOx mass flow is a mass flow of NOx produced at full load.

11. A method of operating a gas turbine engine comprising:
controlling combustion conditions in the gas turbine engine to produce power over a range of power levels in response to a demand; and
controlling the combustion conditions such that a concentration of NOx in exhaust produced by the gas turbine engine increases as the power is decreased and decreases as the power is increased;
wherein a change in concentration of NOx as power is changed is responsive to a change in a total mass flow of the exhaust, such that a total mass flow of NOx in the exhaust is held constant to within 10% of a selected NOx mass flow over the range of power levels;
treating the exhaust with a selective catalytic reduction process to control an amount of NOx released to an ambient environment; and
controlling the concentration of NOx in the exhaust to be higher than a minimum concentration of NOx in the exhaust that could be produced over the range of power levels, such that the total mass flow of NOx in the exhaust is stable over the range of power levels compared to a minimum mass flow of NOx in the exhaust over the range of power levels.

12. The method of claim 11, wherein the treating comprises reducing an amount of NOx in the exhaust using an amount of ammonia, and wherein a mass flow of ammonia utilized in the selective catalytic reduction process corresponds to the mass flow of NOx during operation such that ammonia mass flow values also do not vary more than ±10% over the range of power output levels.

* * * * *